J. McI. OGILVIE.
RUBBER FABRIC.
APPLICATION FILED MAR. 19, 1919.
1,356,783.　　　　　　Patented Oct. 26, 1920.
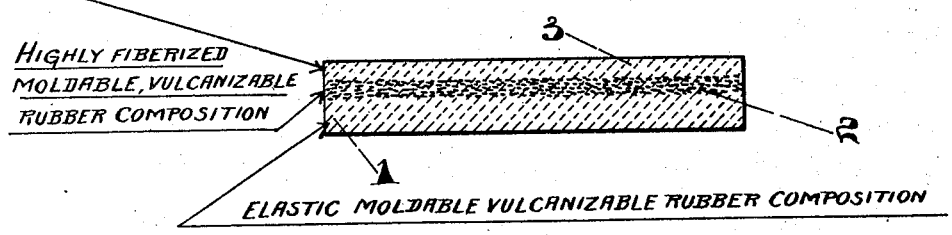
INVENTOR.
J. M. Ogilvie.
BY J. Edward Maybee.
ATTY.

UNITED STATES PATENT OFFICE.

JOHN McI. OGILVIE, OF TORONTO, ONTARIO, CANADA.

RUBBER FABRIC.

1,356,783.  Specification of Letters Patent.  Patented Oct. 26, 1920.

Application filed March 19, 1919. Serial No. 283,541.

*To all whom it may concern:*

Be it known that I, JOHN McI. OGILVIE, subject of the King of Great Britain, and a resident of the city of Toronto, in the county of York and Province of Ontario, Canada, have invented certain new and useful Improvements in Rubber Fabrics, of which the following is a specification.

This invention relates particularly to fabrics for use in rubber heels, rubber soles, stair treads, mats and the like in which considerable elasticity of the tread surface is essential, which ordinarily makes it impossible to satisfactorily secure the fabric to any surface by the use of nails without the use of washers or plates to extend the bearing surface of the nails and my object is to devise a fabric which does not require to have any metal washers or other means for increasing the bearing surface of a nail head embedded therein.

I attain my object by so forming the fabric that, though it is integral in structure, different strata differ in composition and therefore in physical characteristics.

The invention is illustrated in the accompanying drawing which is a cross-section of a piece of material constructed in accordance with my invention.

Assuming the fabric to be intended for use in rubber heels, the lowest stratum 1 will be formed of an elastic moldable vulcanizable rubber composition superimposed on which is a stratum 2 of moldable vulcanizable rubber composition containing a large proportion of fiber disseminated through its mass. By fiberized rubber is generally understood a rubber composition containing a quantity of fiber in an unwoven and generally unspun condition. The fiber in this stratum is sufficient in quantity so that nail heads will not draw through it under any ordinary pull to which the fabric may be subjected. On the highly fiberized stratum a stratum 3 of un-fiberized vulcanizable and moldable rubber composition may be superimposed.

For rubber soles and many other articles, and sometimes perhaps in heels, fiber may be used elsewhere than in the heavily fiberized nail head engaging stratum. While usually the separate strata will be more or less sharply defined a considerable degree of utility may be attained if the different strata merge more or less gradually into one another.

The material may be formed in sheets and subsequently cut or else molded to the shape of the finished article. In any case the material after it has been built up as described is suitably vulcanized.

I find that nails may be readily driven through the softer more flexible and more resilient stratum, even though holes may not have been molded therein, until their heads are arrested by the denser, tougher, less flexible and less resilient stratum.

This stratum acts in the same way as the washers commonly employed in rubber heels or other nailed rubber fabrics.

While useful in all cases where the material is to be held by nails, screws, bolts, rivets, etc., this product is also useful where the stretchability of one side of an article is to be limited.

What I claim as my invention is:

A compound integral fabric for rubber soles and heels comprising a stratum of moldable elastic rubber and a stratum of highly fiberized moldable rubber compound superimposed on the lower stratum and vulcanized thereto, and a top stratum of substantially unfiberized and moldable rubber compound vulcanized to the fiberized stratum.

Signed at Toronto this 7th day of March, A. D. 1919.

JOHN McI. OGILVIE.